Patented Jan. 13, 1953

2,625,484

UNITED STATES PATENT OFFICE 2,625,484

LARD CRYSTAL MODIFICATION

William E. Dominick, Chicago, De Witte Nelson, Elmhurst, and Karl F. Mattil, Chicago, Ill., assignors to Swift & Company, Chicago, Ill., a corporation of Illinois No Drawing. Application November 19, 1951, Serial No. 257,184

9 Claims. (Cl. 99—118)

The present invention relates to the treatment of lard, and more particularly to the production of lard and lard-containing products having improved properties.

Lard, commercially the most important triglyceride material from an animal source, is fat obtained from the fatty tissue of hogs by a heat, solvent or enzyme treatment of the fatty tissue. The most common method of obtaining lard from the fatty tissue of hogs is the so-called wet or steam rendering treatment in which the fat is separated from the tissue by means of pressure with hot water or steam to give what is known as prime steam lard. Another common method of obtaining lard is by the dry rendering process in which fat is removed from the fatty tissue by means of heat alone. The latter method of obtaining lard includes the kettle rendering process in which the fat is melted in a hot water or a steam jacketed kettle. Other methods of obtaining lard, such as solvent and enzymatic treatment of fatty animal tissue, while not widely used on a commercial scale, are potentially important sources of lard.

After recovering the lard from the fatty tissue, the lard is generally treated to impart certain desired characteristics thereto. Thus, the lard may be settled, bleached, refined, washed, filtered, and deodorized to yield a substantially odorless and tasteless product.

Lard is often further treated to impart thereto the desired degree of plasticity, as when the lard is to be used in baked products. This desired plasticity may be obtained by a process which includes compounding therewith hardened lard or an hydrogenated vegetable fat, incoporating air therein and chilling. Of particular importance in the texturizing process is the chilling step. This chilling of the lard may be accomplished by means of chill rolls or an internal chilling machine. In the former method molten fat is picked up on the surface of the internally chilled rotating rolls and then subsequently scraped therefrom and further worked to give the lard a uniform plastic consistency. Chilling by means of an internal chilling machine is accomplished by passing molten fat through a series of vertical or horizontal units where the fat is supercooled and allowed to solidify while being rapidly worked. The lard product treated in the foregoing manner is generally employed as a shortening. Heretofore the plasticity of the final product has depended to a great extent on the nature of the foregoing chilling operation, and the final plasticity has been highly sensitive to the conditions of the chilling step. For this reason the operating conditions in the chilling step have necessarily been very critical and required very careful control.

Another important characteristic of a shortening is its creaming ability. This creaming ability is a measure of the amount of air that can be incorporated into a batter during the mixing operation. The greater the amount of air absorbed and retained by the fat, the greater the leavening effect of the shortening. Thus, for example, the texture and volume of a cake may be improved by the use of shortening possessing superior creaming properties. The creaming ability of a shortening may be determined by measuring the density of the batter or dough, or by measuring the volume of a cake in which the shortening has been incorporated. A high specific gravity indicates a relatively dense mass with only a small amount of incorporated air, while a low specific gravity indicates a light, fluffy mass having a large amount of air incorporated therein. In general, the value of a shortening increases with its ability to absorb air.

Still another very important characteristic of a shortening is its appearance, particularly after being held at the elevated temperatures frequently encountered during distribution and sale of the product. Solidified animal triglyceride material such as lard and lard-containing products frequently have a dull, waxy, and Vaseline-like appearance which becomes progressively more pronounced the longer the product is held. The appearance of lard and lard-containing products is generally considered much inferior to the appearance of vegetable shortenings which have been held under comparable storage conditions, since vegetable shortenings possess a smooth, satiny luster which is retained even after prolonged storage.

While lard has unsurpassed shortening properties, the vegetable shortenings are generally considered to have superior creaming and emulsifying properties as well as improved appearance and storing properties. One of the principal causes for the inferiority of the appearance, storing properties, creaming ability, and emulsifying properties of the lard is the needle-like, crystal formation which the lard glyceride molecules assume upon solidifying and which continue to grow during storage. The long, needle-like crystals impart to lard and lard containing products the waxy, rubber-like texture or graininess which becomes much more pronounced and highly objectionable on standing at the relatively high temperatures generally encountered when distributing through normal commercial channels. Although it has been found possible to temporarily alter the crystallization pattern of lard by packaging while holding the lard at a carefully controlled, relatively low temperature, the lard crystals soon revert to their natural long, needle-like form when the lard is allowed to stand at room temperature. For this reason, the foregoing temperature treatment during the packaging of lard is of no practical value when applied to lard which is to be distributed through normal commercial channels.

In order to overcome the foregoing objectionable properties of lard and lard-containing products which have been found to be attributable to the normal crystallization habit of lard, it is an essential object of the present invention to permanently alter the normal crystallization habit of the lard to that of hydrogenated vegetable oil shortening.

An additional object within the broad scope of the invention is to provide lard in which the heat of crystallization normally associated with the said lard is substantially altered.

Another object of the invention is to provide a product containing lard having improved plastic properties, including improved pliability and workability.

An additional object of the invention is to provide a lard product having improved appearance characterized by a smooth velvety sheen typical of hydrogenated vegetable oil shortening.

A further object of the invention is to provide a lard product having properties which equal or excel those of vegetable shortening while maintaining the superior shortening characteristic of lard.

Still another object of the invention is to provide a lard product having improved baking and keeping qualities, including enhanced emulsifying and creaming properties.

A still further object of the invention is to provide a satisfactory lard product which can be texturized with a greater degree of flexibility in the operating conditions.

Still further objects of the invention will be apparent from the following description and claims.

In accordance with the present invention, it is proposed to subject lard to a heat treatment in the presence of a substance capable of changing the crystallization properties thereof under conditions which do not cause an appreciable change in the melting point of the glyceride material or a significant change in the distribution of the several types of triglyceride molecules in the fatty material being treated. The reaction which modifies the triglyceride molecules is highly complex and the mechanism is not completely understood. It has been observed, however, that the crystal habit and the heat of crystallization of the triglyceride molecules of lard are very significantly affected. And, since the substances capable of modifying the crystallization properties of triglyceride molecules do not become part of the crystal modified triglyceride molecules, the reaction appears to be catalytic. Therefore, the effective substances are herein referred to as crystal modifying catalysts.

In marked contrast with the previous method of catalytically treating lard, the herein-disclosed crystal modifying treatment does not cause an appreciable change in the melting point of the material, chemical composition of the fatty acid groups of the glyceride molecules, nor a significant change in the proportions of the several types of glyceride molecules in the material being treated. Thus, there appears to be no significant amount of interesterification of the glyceride molecules under the conditions employed in the present invention.

More particularly the present invention contemplates heating lard at relatively moderate temperatures above the melting point of the highest melting point components of said glyceride material in the presence of a crystal modifying catalyst for a period sufficient to substantially alter the normal crystallization habits of the triglyceride molecules but without causing any significant amount of interesterification of triglyceride molecules.

It has been found that the alkali metals are very effective as crystal modification catalysts in accomplishing the purposes of the present invention. More specifically, dispersions of the alkali metals have been found to be particularly effective as crystal modification catalysts. The dispersions may be either prepared prior to adding to the fatty material being crystal modified or may be formed in situ. The preformed alkali metal dispersions preferably are stable suspensions of the metals in an inert media having a boiling point above the melting point above the particular alkali metal being dispersed. Particles of the metals range in size from submicrons to 60 microns in diameter. Dispersions of sodium, for example, may be prepared in inert hydrocarbons such as toluene, xylene, naphtha, kerosene, white oil, petroleum jelly, paraffin, and naphthalene, or in other organic media which does not appreciably react with the sodium at temperatures above the melting point of sodium. The dispersing media is selected so as to be compatible with the material being treated. Dispersions containing as much as 50 per cent by weight of alkali metals can be readily prepared and are stable at elevated temperatures, since there is no appreciable coalescence when the mixture is heated above the melting point of the alkali metal.

The preparation of an alkali metal dispersion, such as sodium dispersion, is relatively simple and may be effected by melting sodium in an inert media such as toluene and adding small amounts of dispersing and stabilizing agents to the mixture while it is being vigorously agitated and the temperature of the mixture maintained between the melting point of the metal and the boiling point of the metal and the boiling point of the solvent. The reduction in the size of the metal particles is aided by the addition of the dispersing agent and the fine particle size is maintained by the stabilizing agent which forms a gel structure to prevent coalescence of the metal particles.

Many stabilizing and dispersing agents have been used such as oleic acid and oleic acid and carbon. In addition, the following compounds have been found of value in the production of alkali metal dispersions, such as sodium dispersions; fatty monoglycerides, dimerized linoleic acid, fatty amines, pyridine, and aluminum stearate. Variable other dispersing and stabilizing agents may be used. Minor ingredients in the medium often act as dispersants.

In plant scale operations for the preparation of sodium dispersion, the sodium and the dispersing medium are heated to about 110° C. After the sodium is melted, it is pumped from the sodium melt tank to a premixed tank. The agitator is then started and after a uniform mixture is obtained, the dispersing and stabilizing agents are added. The mixture is stirred until it assumes a uniform light gray color, after which it is passed through a colloid mill.

It is frequently more convenient to form the alkali metal dispersion directly in the material being crystal modified. Thus, a dispersion of sodium in lard, for example, can be readily prepared by heating the lard to a temperature of about 100° C., adding metallic sodium in block form, and after the sodium has melted, a high speed agitator readily disperses the sodium throughout the lard, thereby forming a suitable dispersion of sodium in the lard.

The concentration of catalyst depends somewhat upon the condition of the alkali metal catalyst and the fatty material being treated and generally varies between about 0.15 per cent and 1.0 per cent by weight of the alkali metal, although larger amounts do not prevent modification. If the fatty material is refined to remove all free fatty acids and all moisture driven out prior to treating with the crystal modification catalyst, a smaller concentration of catalyst could be used. It has been observed that a lard having a high peroxide value requires a larger amount of catalyst to completely crystal modify than a lard which has a low peroxide value. Thus, for example, when the lard to be modified has an initial peroxide value of 60, it has been found desirable to increase the concentration of catalyst to about 1.0 per cent, whereas the same lard having a perioxide value of around two or three requires only about 0.2 per cent sodium by weight in dispersed form as catalyst for crystal modification. It is therefore desirable to employ a lard having a relatively low peroxide value.

The time of treatment required to produce crystal modified lard varies with the temperature and the concentration of catalyst employed and must be carefully correlated in order to produce crystal modified lard. Within the effective temperature range, the reaction proceeds very rapidly, while at lower temperatures below about 55° C. the speed of reaction is extremely slow. The minimum temperature at which the crystal modification reaction can be carried out is the temperature at which the highest melting point constituent of the material being treated will just remain in solution, since removal of the higher melting point constituents is undesirable. When the concentration of catalyst is reduced below the optimum concentration, more time is required to complete the crystal modified reaction, and if the critical lowest concentration of catalyst is not used, modification does not occur even after prolonged treatment. When a sufficient quantity of catalyst is used, the time required for crystal modification treatment is dependent primarily on the temperature at which the treatment is carried out. At temperatures between about 70° and 170° C. the crystal modification reaction proceeds rapidly and is generally completed in a period of 3 minutes or less, with the reaction taking place almost instantaneously at 170° C. In commercial operations, however, it is not unusual to treat the lard for periods as long as 30 minutes at a temperature of about 98° C. At temperatures of 55° C. crystal modification does not take place when the lard is heated for a period of one hour, and it has been found necessary to heat the lard from about 2 hours at 55° C. in order to produce crystal modification. At temperatures below 55° C. longer periods of heating are required, and it is generally considered impractical to conduct the crystal modification reaction at the foregoing low temperatures. In no event should the reaction be carried out at temperatures at which any fraction of the lard does not remain in the liquid phase. At temperatures of 180° C. and above crystal modification does not take place even on prolonged heating. The practical temperature range within which crystal modification can be effected is therefore between about 55° and 170° C. but is preferably between about 90° and 110° C. Incompletely modified lard gives only a temporary increase in pound cake volume and does not possess the same crystal habit as hydrogenated vegetable oil shortening, nor does it possess the improved keeping properties of crystal modified lard. In practice the completion of the crystal modification reaction is clearly indicated by the forming of a reddish-brown color throughout the lard mixture as soon as crystal modification has taken place. This change in color does not permanently impair the color of the final lard since it is substantially removed during the conventional bleaching treatment of lard.

In addition to the foregoing concentration, temperature, and time factors, it has been found that when the alkali metal catalysts are very finely dispersed in an inert media, a shorter period of treatment and smaller concentration of the catalysts are required to effect crystal modification than when coarser dispersions are used.

The lard may be heated in the presence of the catalyst at any stage of processing, and the beneficial results of the crystal modifying treatment are not impaired by subsequent processing such as deodorization and hydrogenation. It is also unnecessary to hold the crystal modified product at any particular temperature in order to retain the beneficial properties imparted to the material. It is preferred to treat the lard with the catalyst prior to refining thereof. Where it is desired to omit the treatments generally employed to impart improved characteristics, the rendered lard may advantageously be directly heated in the presence of the herein-disclosed catalysts to produce crystal modified lard.

The specific examples given herein illustrate the treatment of lard with metallic sodium and potassium as the crystal modifying catalysts. In all cases the treated lard possessed a striking appearance which was quite different from that of untreated lard, and had the characteristic satiny luster of vegetable shortening that readily distinguished it from conventional lard. In addition the plastic properties of the treated lard were superior, and cakes made therewith generally had a larger volume and a finer grain and texture than the cakes made with untreated lard. Although cake volume cannot be considered the standard for determining crystal modification, indications are that dough prepared with the modified lard is capable of entrapping greater quantities of air than is the case with dough made with untreated lard. The texture and fine grain of the cakes also indicate a uniform dispersal of the air throughout the dough.

The specific examples to follow should be considered as merely illustrative of the herein-disclosed process and resulting product and should in no way be construed to limit the invention to the particular materials or conditions disclosed therein:

Example I

Thoroughly dried prime steam lard (1500 grams) was mixed with 0.52 per cent sodium dispersion based on the weight of the dried lard and heated at a temperature of 95° C. for a period of 10 minutes. The sodium dispersion in toluene consisted of 50 per cent by weight of sodium particles having an average size of 15 microns and a range of particle sizes between 30 and 1 microns, 1 per cent pyridine, 2 per cent oleic acid added as dispersion stabilizers, and the balance being toluene. At the end of the 10-minute heating period the lard mixture was reddish brown in color and was found to be completely crystal modified. The lard exhibited the following physical characteristics before and after treatment:

|  | Treated Lard | Untreated Lard |
| --- | --- | --- |
| Free fatty acid_____percent__ | 0.22 | 0.56 |
| Softening Point_____°F__ | 99 | 94 |
| Melting Point_____°F__ | 109 | 112 |
| Cloud_____°F__ | 96 | 92 |

In addition to the foregoing properties, the treated lard exhibited the characteristic velvety sheen associated with crystal modified lard and retained a substantially larger volume of air when texturized than the control sample of unmodified lard.

An X-ray diffraction pattern of the treated lard was the same as that of hydrogenated vegetable shortening (hydrogenated cottonseed oil shortening), further illustrating that a fundamental alteration of the crystal nature of the lard has been effected.

The treated lard was formulated into a shortening by compounding 85 per cent treated lard with 15 per cent hydrogenated fat (50-60 titer lard) and samples were also stored at a temperature of 97° F. and periodically compared with a control sample of compounded shortening containing the original lard which had not been heated in the presence of a catalyst. While both the control and the crystal modified lard-containing sample exhibited a very satisfactory appearance at the end of the third day, there was a very noticeable difference between the two samples by the end of the second week. The control sample appeared to have a dull appearance and a stiff or relatively hard, crinkly texture, whereas the crystal modified lard-containing sample retained its original velvety sheen and smooth creamy texture. As the holding period continued, the foregoing differences were even more apparent, with the crystal modified sample retaining its attractive appearance.

After holding the control and test sample for a period of four and a half weeks at 97° F., portions thereof were returned to 75° F. and tested in the bakery. The volume of the pound cake produced by the shortening containing crystal modified lard was 1435 cc. prior to storing at 97° F. and was 1410 cc. after storing at 97° F. for four and a half weeks. The volume of the pound cake produced by the shortening containing unmodified lard decreased sharply from 1415 cc. to 1050 cc. after the shortening had been stored at 97° F. for four and a half weeks.

The foregoing data clearly show that the compounded shortening containing crystal modified lard retains most of its improved appearance and cake-baking properties on storage at an elevated temperature, whereas the shortening containing unmodified lard becomes very poor in appearance, texture, and cake-baking ability under the same storage conditions. This ability of crystal modified lard and compounded shortenings made therefrom to retain their improved appearance, texture and cake-baking properties after prolonged storage and on storage under adverse conditions normally encountered in commercial channels is an extremely important characteristic of crystal modified lard. And, even when the increase in the volume of a pound cake produced by the crystal modification treatment is considered only moderate as compared with the original lard, it has been consistently observed that the lard treated in accordance with the herein-disclosed process and shortenings made therewith retain their original desirable appearance, textural, and performance characteristics for a prolonged period of storage under adverse conditions, whereas the untreated lard and incompletely treated lard and lard-containing shortening products lose their desirable characteristics in a relatively short time under normal handling conditions.

Example II

Thoroughly dried prime steam lard (1500 grams) was heated to 80° C. with 6.9 grams (0.2%) of the same sodium dispersion employed in Example I for a period of 25 minutes. The catalyst was deactivated with water and the refined lard was recovered.

An analysis of the treated and untreated samples gave the following results:

| Analysis | Control Sample | Test Sample |
| --- | --- | --- |
| Titer (° C.)_____ | 41.3 | 41.7 |
| Iodine number_____ | 61.0 | 60.8 |
| Saponification number_____ | 197.6 | 197.3 |
| Glycerine_____ | (¹) | (¹) |
| Monoglycerides_____ | 0.16 | 0.18 |
| Linoleic acid_____ | 10.8 | 10.4 |
| Linolenic acid_____ | 0.64 | 0.61 |

¹ Less than 0.5%.

It is evident from the foregoing that there has been no appreciable change in chemical composition of the lard as a result of the crystal modification treatment.

The treated lard possessed a smooth, velvety sheen similar in quality to hydrogenated vegetable oil shortening and was much superior in appearance and in textural properties to the control sample.

Example III

Thoroughly dried prime steam lard (1500 grams) was heated for a period of 45 minutes at 100° C. with 3 grams of a sodium dispersion consisting of 50 per cent sodium having a particle size between 50 and 1 microns with an average size of 15 microns dispersed in xylene and with 2 per cent aluminum stearate added as a stabilizing agent. At the end of the 45-minute period there was no change in the color of the lard mixture nor did a sample show the characteristic velvety sheen when a portion was chilled while being stirred. An additional 3 grams of sodium dispersion was then added to make a total of 0.2 per cent by weight of sodium in the reaction mixture. At the end of an additional 15-minute period of heating at 95° C. the lard was completely crystal modified as evidenced by the characteristic reddish brown color of the reaction mixture and the smooth, velvety sheen of the texturized lard after it was separated from the catalyst and foots in the regular manner.

Samples of the above lard were refined, bleached, and then chilled while being agitated. There was a very apparent difference in the appearance of the texturized products. The original lard heated without a catalyst had a Vaseline-like appearance whereas the treated sample taken had a velvety sheen and a smooth, creamy consistency.

*Example IV*

Thoroughly dried killing lard (1500 grams) was heated to 95° C. and 0.5 per cent potassium dispersion in xylene was added and the heating continued for a period of 10 minutes. The lard so treated was completely crystal modified, and after being bleached and filtered exhibited the characteristic appearance of crystal modified lard. As with the sodium dispersion catalyst, the potassium dispersion in xylene consisted of 50 per cent by weight potassium having a particle size between $30\mu$ and $1\mu$ with an average size of $15\mu$, 1 per cent pyridine, 2 per cent oleic acid, and the balance xylene.

The filtered lard was chilled and rapidly agitated in an ice bath until plastic in the texturizing operation. A portion of the original untreated lard was also chilled and texturized in the foregoing manner as a control sample. The untreated product after chilling was found to have a waxy, rubbery texture, while the texturized, catalytically treated lard was unexpectedly found to be softer, more plastic, and to have the creamy, velvety texture characteristic of a hydrogenated vegetable shortening.

The two samples of lard, one catalytically treated and the other untreated, were tempered at 75° F. for a period of 24 hours, and consistency readings of each were taken with the Bloom consistometer. The Bloom consistency readings obtained showed that the catalytically treated lard at a temperature of 75° F. offered practically no resistance to the head of the plunger, whereas the control sample of untreated lard at the same temperature offered appreciable resistance to the head of the plunger. The foregoing results were observed to be characteristic of the treated lard at temperatures above about 45° F.

*Example V*

Thoroughly dried prime steam lard (156 pounds) was heated in a closed kettle to a temperature of 242° F. and metallic sodium (180 grams) in the form of ¾-inch cubes was added to the heated lard. As soon as the sodium had completely melted, a high-speed dispersing agitator was started so as to finely disperse the sodium throughout the heated lard. There was an almost instantaneous color change to the typical red brown color indicative of crystal modification. After stirring for 5 minutes, 1¼ pounds of urea was added to neutralize the sodium. The mixture was then cooled to 160° F. and water was added to hydrate the foots. The crystal modified lard was then separated from the foots and recovered. During the modification reaction, the lard was at all times blanketed with nitrogen. Immediately after the addition of the sodium the temperature of the lard mixture rose slightly to 250° F.

The lard treated in the above manner possessed the characteristic properties of crystal modified lard.

*Example VI*

Thoroughly dried prime steam lard (181 pounds) was heated to 243° F. in a closed kettle having a side stirrer and a central high-speed dispersing agitator. When the temperature of the lard reached 243° F., 120 grams of metallic sodium in the form of ¾-inch cubes were added to the lard. The sodium was dispersed as in Example V and the temperature of the lard rose slightly to 247° F. Since there was no detectible color change, additional metallic sodium (30 grams) was added and dispersed in the above-described manner. As soon as the additional 30 grams of sodium was dispersed, there was an immediate color change, indicating that crystal modification had taken place. After stirring for 5 minutes, the mixture was cooled to 160° F. and water added to hydrate the foots. The crystal modified lard was then separated from the foots and recovered.

The lard treated in the foregoing manner possessed a smooth, velvety sheen similar to hydrogenated vegetable oil shortening, and exhibited the characteristic properties of crystal modified lard.

In each of the foregoing examples the per cent catalyst used was based on the weight of the lard being treated.

In order to detect the completion of the crystal modification reaction and show the fundamental alteration of the crystal structure produced by treating lard in accordance with the herein-disclosed process, the X-ray diffraction pattern of lard is examined before and after treatment by techniques similar to the methods described in Lutton, J. A. C. S., 67, 524 (1945), and Lutton, J. A. O. C. S., 27, 276 (1950). The X-ray diffraction pattern pictures of samples of regular lard and of crystal modified lard taken according to the above methods show that the stable crystal habit of the treated lard at the room temperatures encountered during sales, distribution, and storage, is no longer the same as that of regular untreated lard and has been transformed from its natural beta phase to the beta prime phase. Furthermore, when the X-ray diffraction pattern pictures of crystal modified lard, hydrogenated cottonseed oil, and hydrogenated cottonseed oil shortenings, are compared, it is found that each has the same crystal habit and crystallizes in the beta prime phase as its normal and stable form.

The improved lard obtained in accordance with the herein described invention can be used as an all-purpose shortening in place of both the animal and vegetable shortenings heretofore discriminately employed because of their peculiar properties. The improved lard may thus be advantageously employed in the manufacture of cakes and icings as well as in the preparation of bread and pie crust. Although we have illustrated the invention as being particularly applicable to baked goods, it is also applicable to other food products, such as the manufacture of candy and fried products. It is also understood that the improved fat may be advantageously used in lubricants, greases, cosmetics, medicated ointments, and in many other industrial applications. The improved lard of the present invention can also be advantageously used in the preparation of an improved margarine product.

From the foregoing specific examples describing the characteristics and improved properties and new uses of crystal modified lard it will be very apparent to those skilled in the art that crystal modified lard is particularly useful in the preparation of improved shortening products. Thus, any shortening product which has heretofore consisted of a substantial proportion of animal triglyceride material, such as lard, will be provided with very substantially improved appearance and baking properties, particularly after holding at the usual temperatures encountered in commercial channels by substituting crystal modified lard for all or part of the unmodified lard in the shortening. The resulting shortening product has been found to have the desirable properties characteristic of an all-vegetable shortening while retaining the superior shortening properties of lard. The improved results obtained with crystal modified lard are in no way dependent upon the presence of monoglycerides, since the desirable properties are not lost as a result of the deodorization treatment.

The term "textural properties" as used in the claims refers to those performance characteristics of the fatty material which are indicative of the utility of the material as a shortening agent in baked goods, such as the wet cream test, the pound cake specific gravity, and the pound cake volume.

The terms "crystal modification" and "crystal modified lard" as used in the specification and claims to follow designate a transformation of the normal and stable crystal structure from one form to another, and in lard specifically designates a change from the beta phase to the beta prime phase.

Obviously, many modifications and variations of the invention as hereinbefore set forth may be made without departing from the spirit and scope thereof, and therefore only such limitations should be imposed as are indicated in the appended claims.

We claim:

1. A process of treating lard to improve its resistance to deterioration of physical appearance and textural properties, comprising contacting lard with an alkali metal acting as a crystal modification catalyst at a temperature between the temperature at which the highest melting point constituent of the lard just remains in solution and 170° C. until permanently changing the normal crystallization habit and normal X-ray diffraction pattern of the said treated lard to resemble that of hydrogenated vegetable oil shortening, deactivating the said catalyst, and recovering the crystal modified lard free of the said catalyst.

2. A process of treating lard to modify permanently the crystal structure and substantially improve its resistance to deterioration of physical appearance and textural properties, comprising contacting lard with an alkali metal acting as a crystal modification catalyst at a temperature between about 55° C. and 170° C., said treatment being continued until the lard becomes reddish-brown in color and permanently changed in normal crystallization habit and normal X-ray diffraction pattern of the said treated lard to resemble that of hydrogenated cottonseed oil shortening.

3. In the process of treating lard wherein lard is heated in the presence of a crystal modification catalyst, the improvement comprising heating lard in the presence of at least about 0.15 per cent based on the weight of the said lard of a finely divided alkali metal at a temperature between about 55° C. and 170° C. for a period of between about 3 and 120 minutes until the normal crystallization habit and normal X-ray diffraction pattern of the treated lard are permanently changed to resemble that of hydrogenated cottonseed oil.

4. A process substantially as described in claim 3 wherein the catalyst is a dispersion of metallic sodium.

5. A process substantially as described in claim 3 wherein the lard is heated in the presence of a sodium dispersion as the catalyst at a temperature between about 90° C. and 110° C. for a period of between about 3 minutes and 30 minutes.

6. A process substantially as described in claim 3 wherein the catalyst is a dispersion of metallic potassium.

7. In the process of treating lard wherein lard is heated in the presence of a crystal modification catalyst to permanently alter the normal crystallization habit of the said lard, the improvement which comprises heating lard in the presence of a dispersion of sodium in an inert carrier at a temperature between about 55° C. and 170° C. for a period of between about 3 minutes and 120 minutes until the normal crystal structure and X-ray diffraction pattern of the treated lard are permanently changed to resemble that of hydrogenated vegetable oil shortening.

8. A process substantially as described in claim 7 wherein the sodium is dispersed in an inert hydrocarbon.

9. A process of treating lard to modify permanently the crystal structure thereof and substantially improve its resistance to deterioration of physical appearance and textural properties, comprising heating lard substantially free of moisture at a temperature of about 100° C. with about 0.2 per cent sodium by weight dispersed in an inert hydrocarbon carrier based on the weight of the dry lard wherein the weight of the sodium is approximately the same as the weight of the said carrier and has a particle size between about 1 micron and 30 microns for a period of about 3 minutes until the normal crystallization habit and X-ray diffraction pattern of the treated lard in its normal and stable form at room temperature is permanently changed to resemble that of hydrogenated cottonseed oil shortening, deactivating the said catalyst, and recovering the crystal modified lard free of the said catalyst.

WILLIAM E. DOMINICK.
DE WITTE NELSON.
KARL F. MATTIL.

REFERENCES CITED

The following references are of record in the file of this patent:

UNITED STATES PATENTS

| Number | Name | Date |
|---|---|---|
| 2,251,693 | Richardson et al. | Aug. 5, 1941 |
| 2,309,949 | Gooding | Feb. 2, 1943 |
| 2,571,315 | Vander Wal | Oct. 16, 1951 |

FOREIGN PATENTS

| Number | Country | Date |
|---|---|---|
| 249,916 | Great Britain | Mar. 30, 1926 |